United States Patent [19]

Matsuzaki et al.

[11] Patent Number: 5,479,500
[45] Date of Patent: Dec. 26, 1995

[54] COMMUNICATION APPARATUS

[75] Inventors: Susumu Matsuzaki; Teruyuki Nishii; Takahiro Kato, all of Yokohama, Japan

[73] Assignee: Canon Kabushiki Kaisha, Tokyo, Japan

[21] Appl. No.: 858,624

[22] Filed: Mar. 27, 1992

[30] Foreign Application Priority Data

Mar. 28, 1991 [JP] Japan .................................. 3-063632
Apr. 18, 1991 [JP] Japan .................................. 3-114036

[51] Int. Cl.$^6$ .................................................. H04M 1/00
[52] U.S. Cl. ............................................ 379/355; 379/100
[58] Field of Search .................................. 379/355, 356, 379/209, 100

[56] References Cited

U.S. PATENT DOCUMENTS

| | | |
|---|---|---|
| 4,641,133 | 2/1987 | Ono . |
| 4,741,021 | 11/1980 | Kotani et al. ................. 379/355 X |
| 4,811,385 | 3/1989 | Watanabe . |
| 4,910,506 | 3/1990 | Yoshida et al. . |
| 4,956,860 | 9/1990 | Murata ............................ 379/100 |
| 5,077,787 | 12/1991 | Masatomo . |
| 5,125,025 | 6/1992 | Lim ................................. 379/100 |
| 5,151,933 | 9/1992 | Abe ............................. 379/355 X |

FOREIGN PATENT DOCUMENTS 0089655 4/1989 Japan ................................. 379/100

Primary Examiner—Carl D. Friedman
Assistant Examiner—Creighton Smith
Attorney, Agent, or Firm—Fitzpatrick, Cella, Harper & Scinto

[57] ABSTRACT

A communication apparatus for performing auto-redial processing for repetitively calling a distant station using a prestored call number until a connection can be attained, includes a response state detection unit for detecting a response state of the distant station or an exchanger through a line after a calling operation is started, and a control unit for judging according to a detection state of the response state detection unit whether or not the call number is correct, and for, when it is judged that the call number is false, interrupting the auto-redial processing.

24 Claims, 12 Drawing Sheets

FIG. 6A

81 — | TEL NO. |

| ONE-TOUCH DIAL NO. | TEL NO. | INHIBIT-BIT |
|---|---|---|
| NO. 1 | 3 X 7 6  1 7 9 8 | 0 |
| NO. 2 | 3 5 X 1  1 1 2 2 | 1 |
| NO. 3 | 3 1 7 X  1 9 3 6 | 0 |
| NO. 4 | 3 X 5 8  9 7 2 7 | 0 |
| NO. 5 | 3 3 X 1  3 6 0 3 | 0 |
| ⋮ | ⋮ | ⋮ |
| NO. 30 | 3 2 0 X  5 4 0 1 | 0 |

| EXECUTED ONE-TOUCH DIAL NUMBER | NO. 3 |
|---|---|
| REDIAL COUNTER | |
| FALSE DIALING COUNTER | |

COMMUNICATION APPARATUS

BACKGROUND OF THE INVENTION

1. Field of the Invention

The present invention relates to a communication apparatus and, more particularly, to a communication apparatus for performing auto-redial processing for repetitively calling a distant station using a prestored call number until a connection is attained.

2. Related Background Art

Conventionally, in facsimile apparatuses, various data terminals, modem apparatuses, and the like, a so-called auto-dial function is known. With this function, a telephone number, which is stored in advance in association with a one-touch key or an abbreviated dialing operation, is automatically called according to a time measured by a timer or a predetermined key operation.

Furthermore, the auto-dial function often includes an auto-redial function. This function is used for repetitively calling a distant station using a stored telephone number until a response from the distant station is detected.

However, when a call instruction is input, the conventional auto-redial function always performs a redial operation a predetermined number of times until transmission is terminated even in the case of a false telephone number, in a line busy (or exchanger busy) state, or in a distant station busy state.

For this reason, calling operations can only be stopped after a dial operation of even a false telephone number is performed a predetermined number of times. When a person responds to the call at a distant station, he or she feels uneasy. In addition, since a line is wastefully held, communication cost is undesirably increased.

In a facsimile apparatus having an auto-dial function, when a calling party performs a calling operation using the auto-dial function, and a facsimile apparatus of a called party is set in a manual reception mode, if a response from an operator of the called party is delayed, the facsimile apparatus of the calling party cannot detect a facsimile communication procedure signal from the called party within an input signal monitor time (35 sec). As a result, a timer reaches a time-over state, and transmission cannot be performed.

As applications associated with a facsimile apparatus having an auto-dial function, U.S. Pat. Nos. 4,811,385 (issue date: Mar. 7, 1989), 4,910,506 (issue date: Mar. 20, 1990), and 4,641,133 (issue date: Feb. 3, 1987), and U.S. patent application Ser. No. 627,913 (application date: Dec. 17, 1990) are known.

However, there are no proposals that can solve the above-mentioned problems.

SUMMARY OF THE INVENTION

It is an object of the present invention to improve a communication apparatus having an auto-dial function in consideration of the above-mentioned problems.

It is another object of the present invention to provide a communication apparatus, which detects a response state of a distant station or an exchanger after a calling operation is started, judges according to a detection result whether or not a false calling operation is performed, and interrupts auto-dial processing when a false calling operation is determined.

It is still another object of the present invention to provide a communication apparatus, which judges upon an auto-dial operation whether or not a false calling operation is performed, temporarily interrupts auto-redial processing when a false calling operation is determined, and restarts the auto-redial processing when an operator inputs an instruction for continuing the auto-redial processing.

It is still another object of the present invention to provide a facsimile apparatus, wherein in an auto-dial operation, when a response from an operator of a called party is delayed, and a facsimile signal cannot be detected within a predetermined time period, the operator call processing is executed to allow a manual transmission operation.

Other objects of the present invention will become apparent from the following description of the embodiments taken in conjunction with the accompanying drawings.

BRIEF DESCRIPTION OF THE DRAWINGS

FIGS. 6A to 6C are explanatory views showing a memory architecture of the apparatus shown in FIG. 1;

DETAILED DESCRIPTION OF THE PREFERRED EMBODIMENTS

The preferred embodiments of the present invention will be described in detail hereinafter with reference to the accompanying drawings.

A facsimile apparatus having an auto-dial function will be exemplified below as an embodiment of the present invention.

Figure 1:
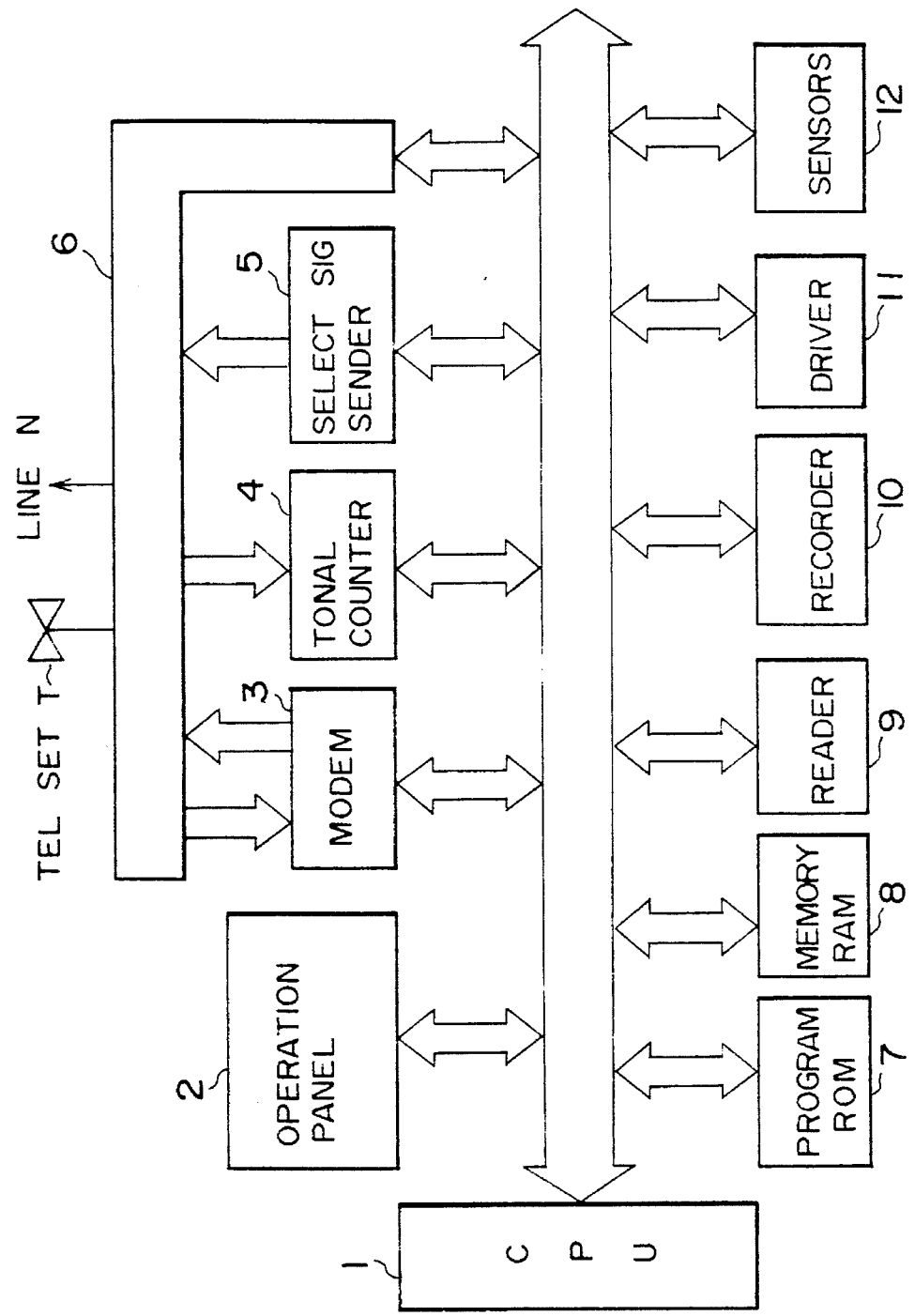
FIG. 1 is a block diagram showing the arrangement of a facsimile apparatus according to the first embodiment of the present invention.

FIG. 1 is a block diagram showing the arrangement of a facsimile apparatus according to the first embodiment of the present invention.

In FIG. 1, a CPU 1 incorporates a DMA (direct memory access) controller, and the like. The CPU 1 controls the system of the facsimile apparatus, and monitors states of the apparatus. Various constituting members are connected to the bus of the CPU 1, as shown in FIG. 1.

An operation panel 2 including a display is used for inputting a command corresponding to a key depression by a user to the CPU 1, and for displaying necessary information for the user.

An NCU 6 switches a line N between the facsimile side and the telephone set T side in response to a command from the CPU 1. All the signals from a modem 3, a tonal counter 4, and a select signal sender 5 to the line are exchanged through the NCU 6.

The modem 3 is a G2/G3 modem, and is used for modulating/demodulating an image and procedure signals.

The tonal counter 4 identifies a reception tone signal by detecting the energy ON/OFF state and the frequency of a received tonal signal.

On the other hand, the select signal sender 5 performs a dialing operation by transmitting a DTMF signal and/or a dial signal based on a pulse signal to the line N through the NCU 6.

A ROM 7 stores a control program (to be described later) for the CPU 1. A RAM 8 is used as a work area for storing various control data, and also as an image memory.

An image input/output operation is performed by a reader 9 and a recorder 10.

The reader 9 comprises a CCD line sensor, an original convey system, and the like, and is used for reading an original image.

The recorder 10 comprises a thermal recording head, a recording sheet convey system, and the like, and is used for recording a received image or an image read by the reader 9 in an original copy mode.

In FIG. 1, convey drive systems of the reader 9 and the recorder 10 are represented by a block 11, and sensors for an original and a recording sheet are represented by a block 12.

Figure 2:
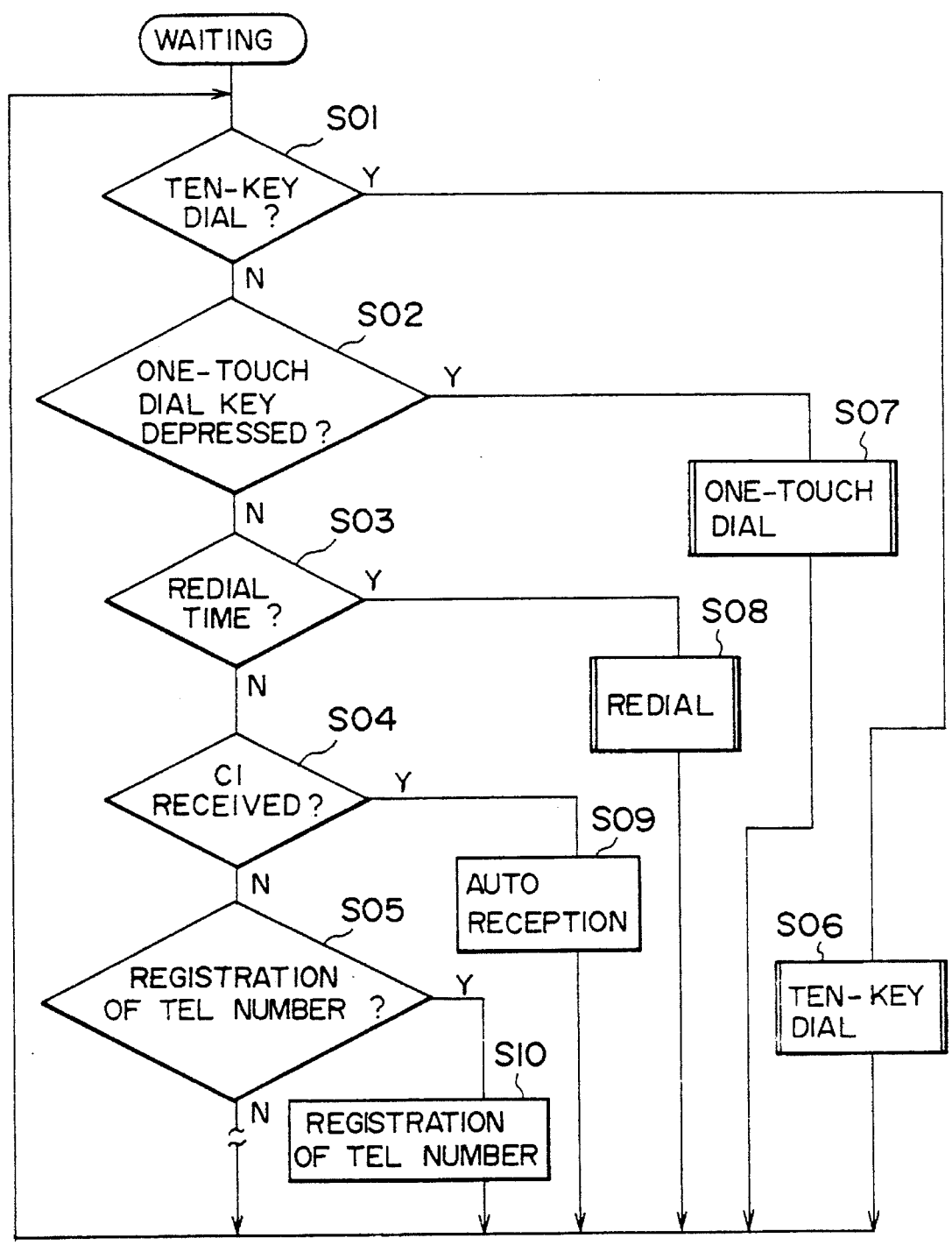
FIG. 2 is a flow chart showing the flow of a control sequence of the apparatus shown in FIG. 1.
Figure 3:
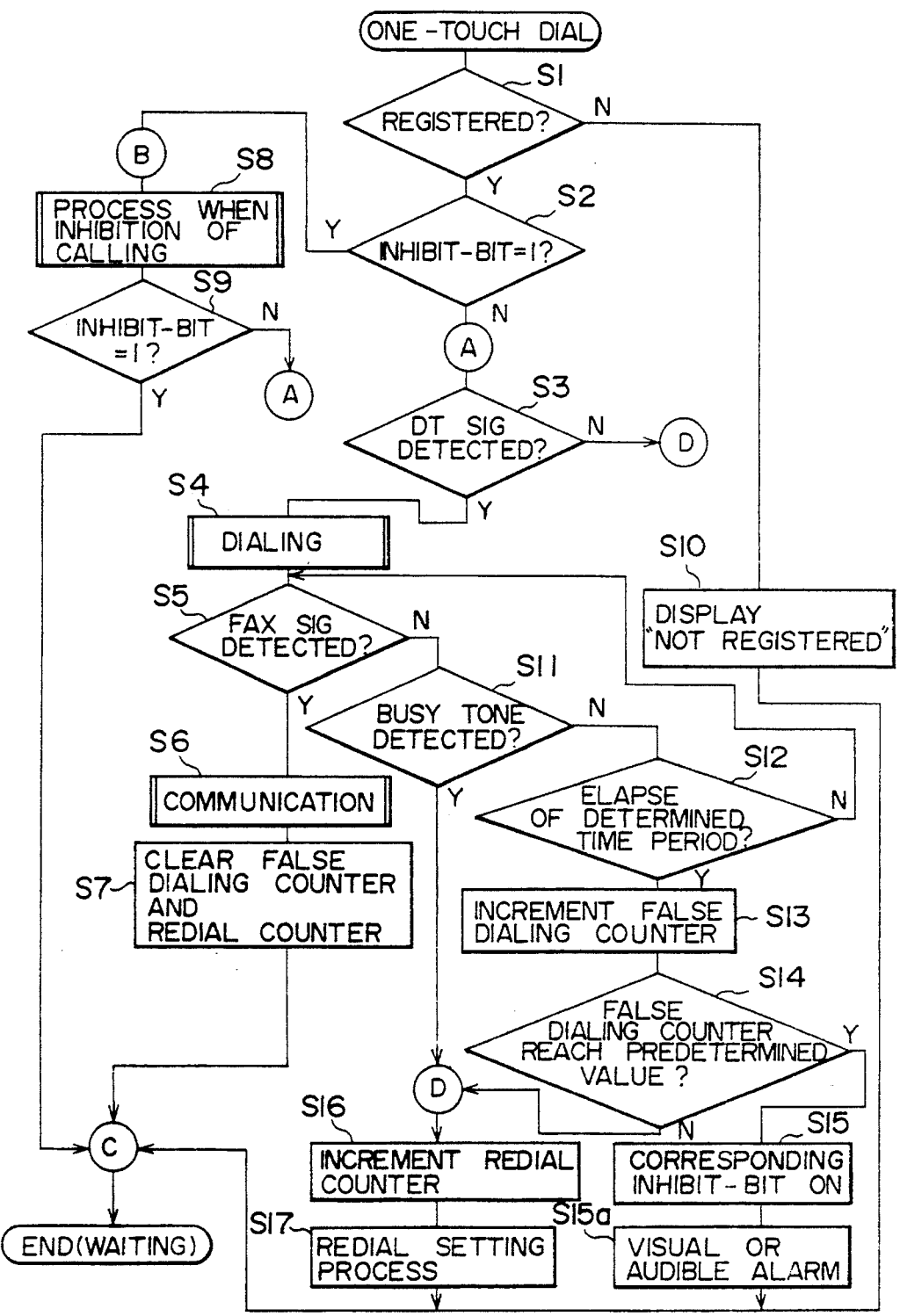
FIG. 3 is a flow chart showing a one-touch key dial control sequence of the apparatus shown in FIG. 1.
Figure 4:
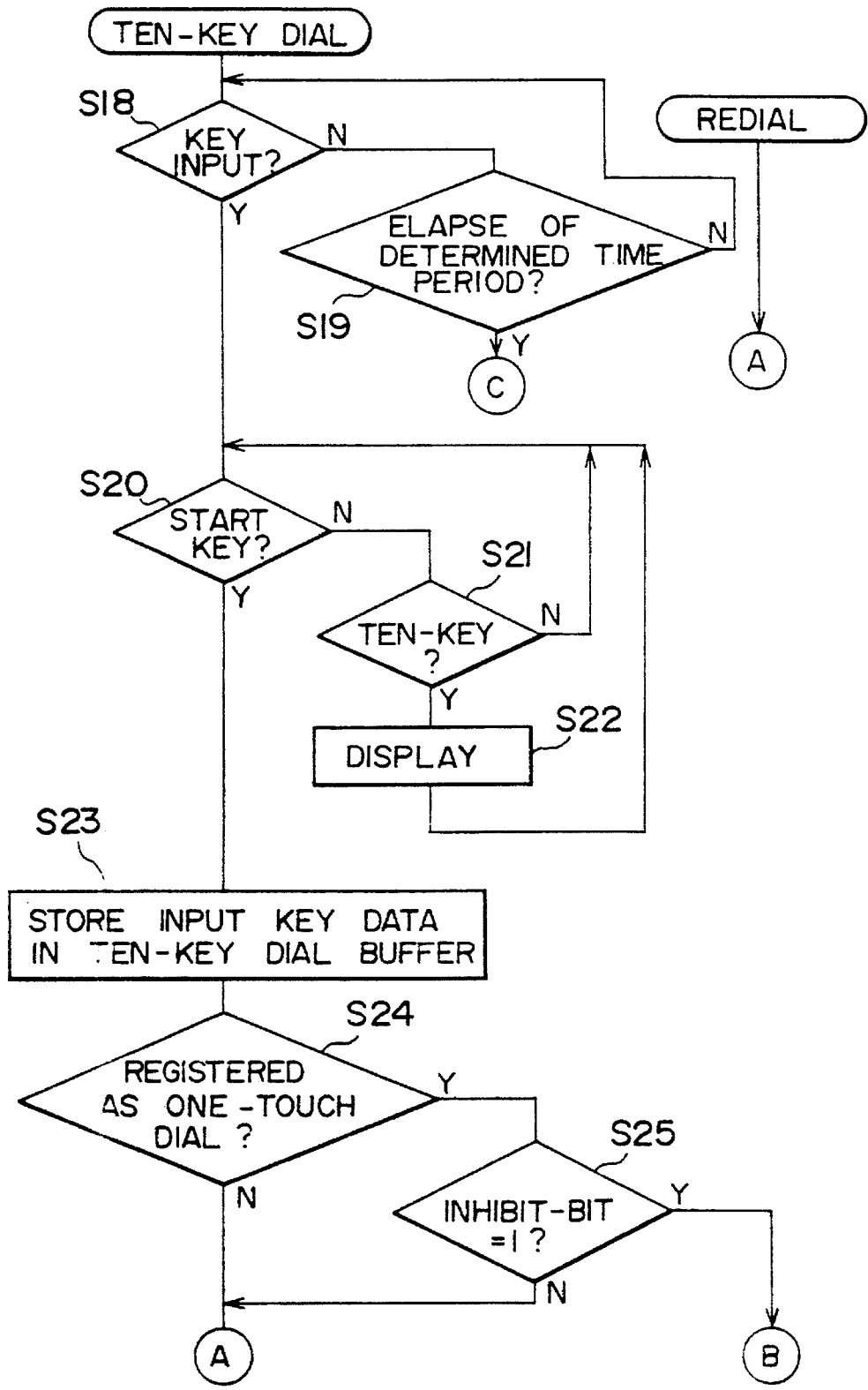
FIG. 4 is a flow chart showing a ten-key dial control sequence of the apparatus shown in FIG. 1.
Figure 5:
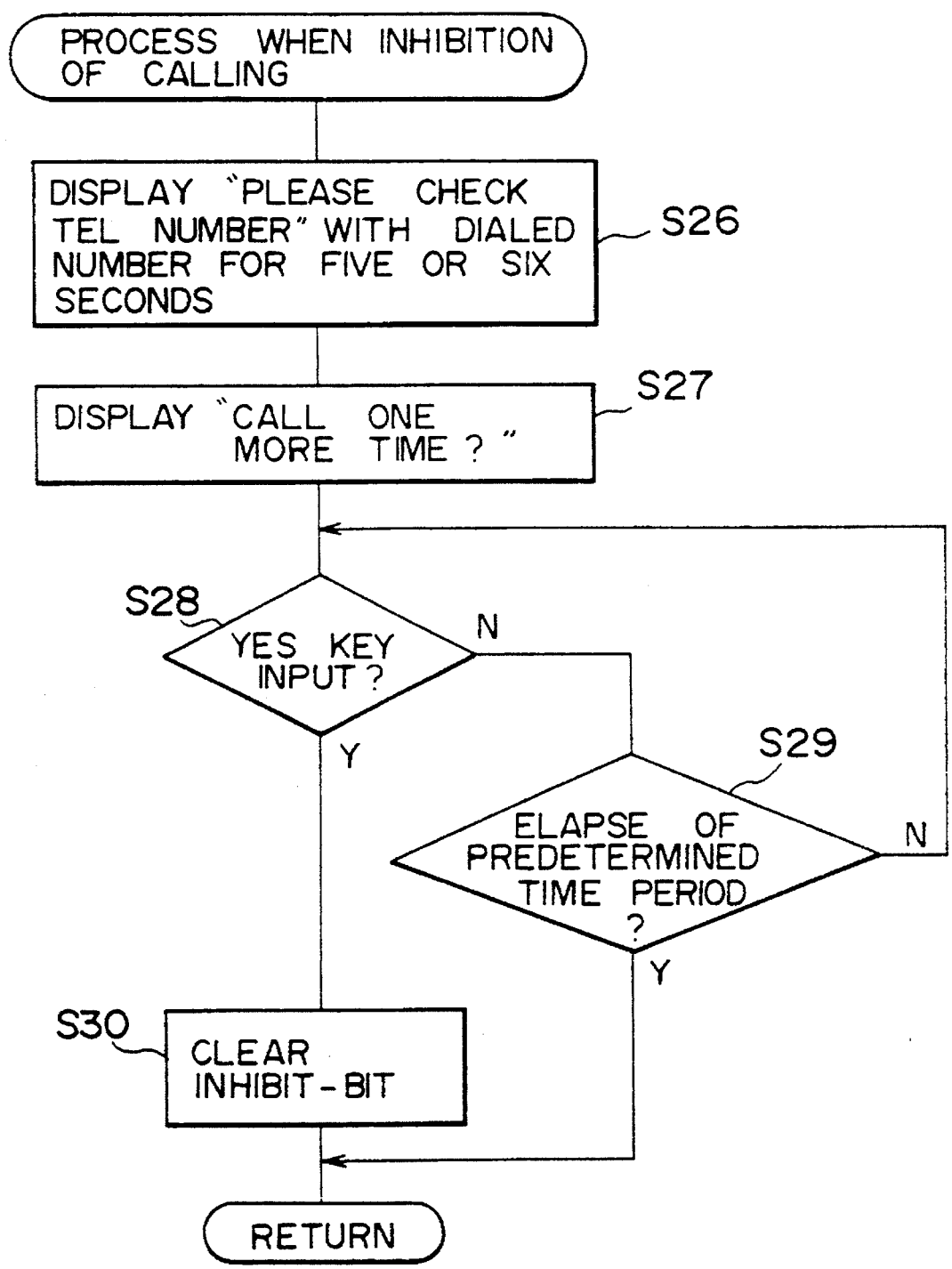
FIG. 5 is a flow chart showing a false dial inhibition control sequence of the apparatus shown in FIG. 1.

The operations of the above arrangement will be described below with reference to FIGS. 2 to 5 and FIGS. 6A to 6C. FIGS. 2 to 5 show the flows of the control program of the CPU 1 stored in the ROM 7. FIG. 2 shows the overall control sequence, and FIGS. 3 to 5 show subroutines in the sequence shown in FIG. 2. Nodes A to D in FIGS. 3 to 5 are assumed to be continuous at the corresponding positions. FIGS. 6A to 6C show the memory architecture in the RAM 8.

The facsimile apparatus of this embodiment causes the CPU 1 to monitor the system in a waiting state. When the operation panel 2 receives a key input in the waiting state, the CPU 1 analyzes the type of key input (or an input word consisting of a plurality of keys) in steps S01 to S05, and executes ten-key dial processing, one-touch dial processing, redial processing, automatic reception processing, and telephone number registration processing corresponding to the key input in steps S06 to S010.

The one-touch dial processing has the following function. That is, dial numbers corresponding to one-touch dial keys on the operation panel 2 are registered in advance in a one-touch dial table 82 in the RAM 8, as shown in FIG. 6B. A number corresponding to the key instructed by an operator is read out from the one-touch dial table 82 to a ten-key dial buffer 81 (FIG. 6A), thereby performing a dialing operation. FIG. 3 shows the flow of this processing.

In the one-touch dial processing, in step S1, the one-touch dial table 82 is looked up according to a depression of the one-touch dial key on the operation panel 2 to check if a corresponding telephone number is registered. If it is determined that the corresponding telephone number is not registered, a message "not registered" is displayed in step S10, and the flow is ended.

Telephone numbers corresponding to the one-touch dial keys are set in predetermined areas in the one-touch dial table 82, as shown in FIG. 6B. For example, in FIG. 6B, an inhibit bit is set to a telephone number, corresponding to the one-touch dial key No. 2, of registered telephone numbers.

If it is determined in step S2 that the inhibit bit is set to the registration data, the flow advances to step S8; otherwise, the line is held, and the tonal counter 4 detects a DT signal (dial tone, i.e., a signal indicating that the line is connected to an exchanger) transmitted from the exchanger in step S3.

If the DT signal cannot be detected within a predetermined time period in step S3, it is determined that the exchanger is busy, and redial processing is performed (node D). When the DT signal is detected, the select signal sender 5 performs a redialing operation in step S4.

In a loop consisting of steps S5, S11, and S12, a response state of a distant station (or the exchanger) is judged for a predetermined time period determined by time judgment in step S12.

In step S5, a facsimile signal is detected by detecting a GI2 signal, a flag, or a CED signal (an initial identification signal indicating a facsimile communication), and in step S11, a busy tone is detected. The facsimile signal is detected by the modem 3 and the tonal counter 4, and the busy tone is detected by the tonal counter 4.

If it is determined in step S12 that no signal is detected for a predetermined time period (e.g., about 45 sec), it is determined that a distant station is not a facsimile terminal, or a person and a facsimile apparatus are not ready to receive, and the flow advances from step S12 to step S13 to increment a false dialing counter. The false dialing counter is allocated in a work area 83, as shown in FIG. 6C.

If it is determined in step S14 that the content of the false dialing counter has reached a predetermined value (e.g., 2), the inhibit bit of the calling registration data in the one-touch dial table 82 is set to be "1" in step S15, and a visual or audible alarm is generated for an operator (step S15a).

If the busy tone is detected in step S11, a redial counter is incremented in step S16, and the next redial time, and the like are set in redial processing in step S17. Thus, the control returns to the waiting state. During execution of the redial processing, the (registration data) number of the one-touch dial key is stored in the work area 83 (FIG. 6C). The redial counter is allocated in the work area 83.

If the facsimile signal is detected in step S5, a communication is performed, and the false dialing counter is cleared in step S7. Thus, the control returns to the waiting state.

A case will be described below wherein an inhibit bit corresponding to a one-touch key is set to be "1" in step S15, and thereafter, an operator selects the key number.

In this case, since the key number has already been registered, the flow passes step S1. Since it is then determined in step S2 that the corresponding inhibit bit is "1", a process when calling is inhibited is performed in step S8.

FIG. 5 shows the process when calling is inhibited. In the process shown in FIG. 5, in step S26, a message for urging an operator to confirm a telephone number, and a dial number are displayed (for, e.g., 5 to 6 sec), and thereafter, a message for asking an operator to call once more is displayed (step S27).

If a predetermined operation for the above-mentioned display is obtained in step S28, the inhibit bit of the corresponding registered telephone number is cleared in step S30. However, if no operation is performed in step S28, a time-over state is determined. The following sequence is the same as that in FIG. 3.

Upon completion of the routine shown in FIG. 5, the flow returns to step S9 in FIG. 3. If it is determined in step S9 that the inhibit bit is not cleared, the processing is ended; otherwise, the flow branches to a calling sequence (step S3) through the node A.

The ten-key dial processing for performing a calling operation using a ten-key pad provided to the facsimile apparatus main body will be described below with reference to FIG. 4.

An input from the ten-key pad on the operation panel 2 is detected in a loop consisting of steps S18 and S19. If a time-over state is determined, ten-key dialing processing is ended.

If it is determined in step S21 that a key input indicating the ten-key dialing processing is received or a ten-key input is directly received, the input content is properly displayed in step S22 to urge a user to check the input content.

The end of input of a series of telephone number numerals is indicated by depression of a start key. If it is determined in step S20 that the start key is depressed, the end of the key input is determined, and the input data is stored in the dial buffer 81 (FIG. 6A) in step S23.

It is checked in step S24 if the dial number has already been registered as a one-touch dial. If the dial number has already registered, the inhibit bit is referred to.

If it is determined that the inhibit bit is set, the flow advances to the node B in FIG. 3 to execute the same process when calling is inhibited as in the one-touch dialing processing; otherwise, the flow advances to the node A to perform a normal calling operation.

When redial processing is performed (by interruption) according to a time measured by a timer, processing from the node A is performed, as shown in FIG. 4.

In this manner, in the ten-key dialing processing, a false dialing operation can be prevented by utilizing the registration data of the one-touch keys.

According to the above embodiment, when an auto-dial operation is performed, or even when an auto-redial operation is to be performed, the response state of a distant station is judged to detect a false dialing operation, and a calling operation for the corresponding telephone number is inhibited. For this reason, the conventional problems (when a person responds to a call at a distant station, he or she feels uneasy, and communication cost is increased since a line is wastefully held) can be avoided.

The second embodiment of the present invention will be described below. In this embodiment, when a facsimile signal from a called party is not detected within a predetermined time period in an auto-dial operation, operator call processing is executed to allow a manual transmission operation.

Figure 7:
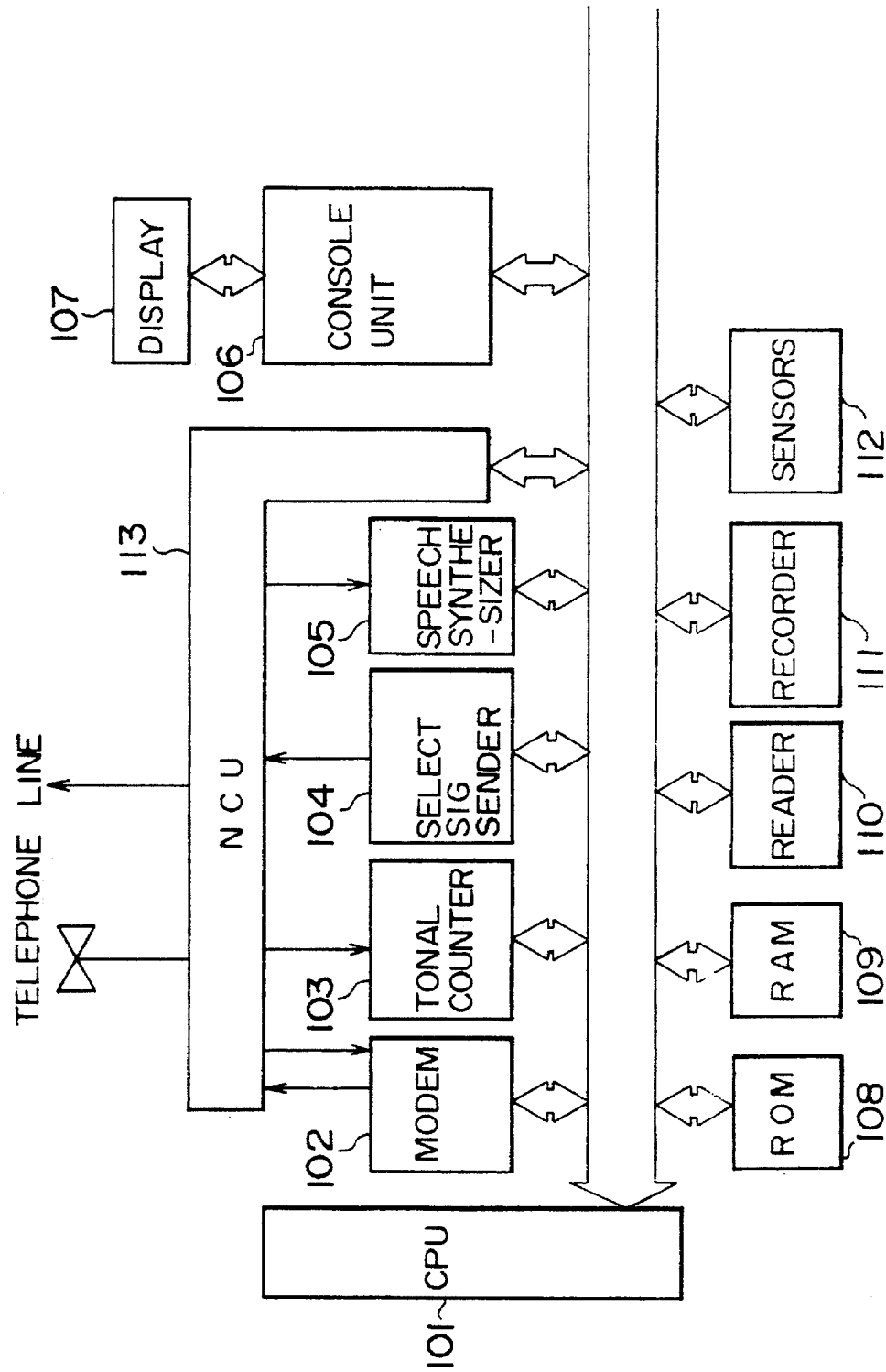
FIG. 7 is a block diagram showing the arrangement of a facsimile apparatus according to the second embodiment of the present invention.

FIG. 7 is a block diagram showing the arrangement according to the second embodiment of the present invention.

A facsimile apparatus according to this embodiment comprises a CPU 101, including a DMA controller, for controlling the overall apparatus, a ROM 108 for storing a control program for the CPU 101, a RAM 109, which serves as a work area for the CPU 101, and stores various data, a console unit 106 for detecting a key input by an operator, and supplying the key input to the CPU 101, a display 107 for receiving display data from the CPU 101, and performing a display, a G2/G3 modem 102 for modulating/demodulating transmission/reception data, and a tonal counter 103 used for detecting a mono-tone signal. The CPU 101 can detect the ON/OFF time of a frequency signal on the basis of an output from the tonal counter 103 and its own software timer.

The facsimile apparatus also comprises a select signal sender 104 for sending a pulse dial signal or a DTMF signal under the control of the CPU 101, a speech synthesizer 105 for outputting a voice message, an NCU 113 for connecting the modem 102, the counter 103, the select signal sender 104, and the speech synthesizer 105 to a communication line, a reader 110 for reading an original, a recorder 111 for recording image information on a recording sheet, and sensors 112 for detecting, e.g., the presence/absence of an original.

Figure 8:
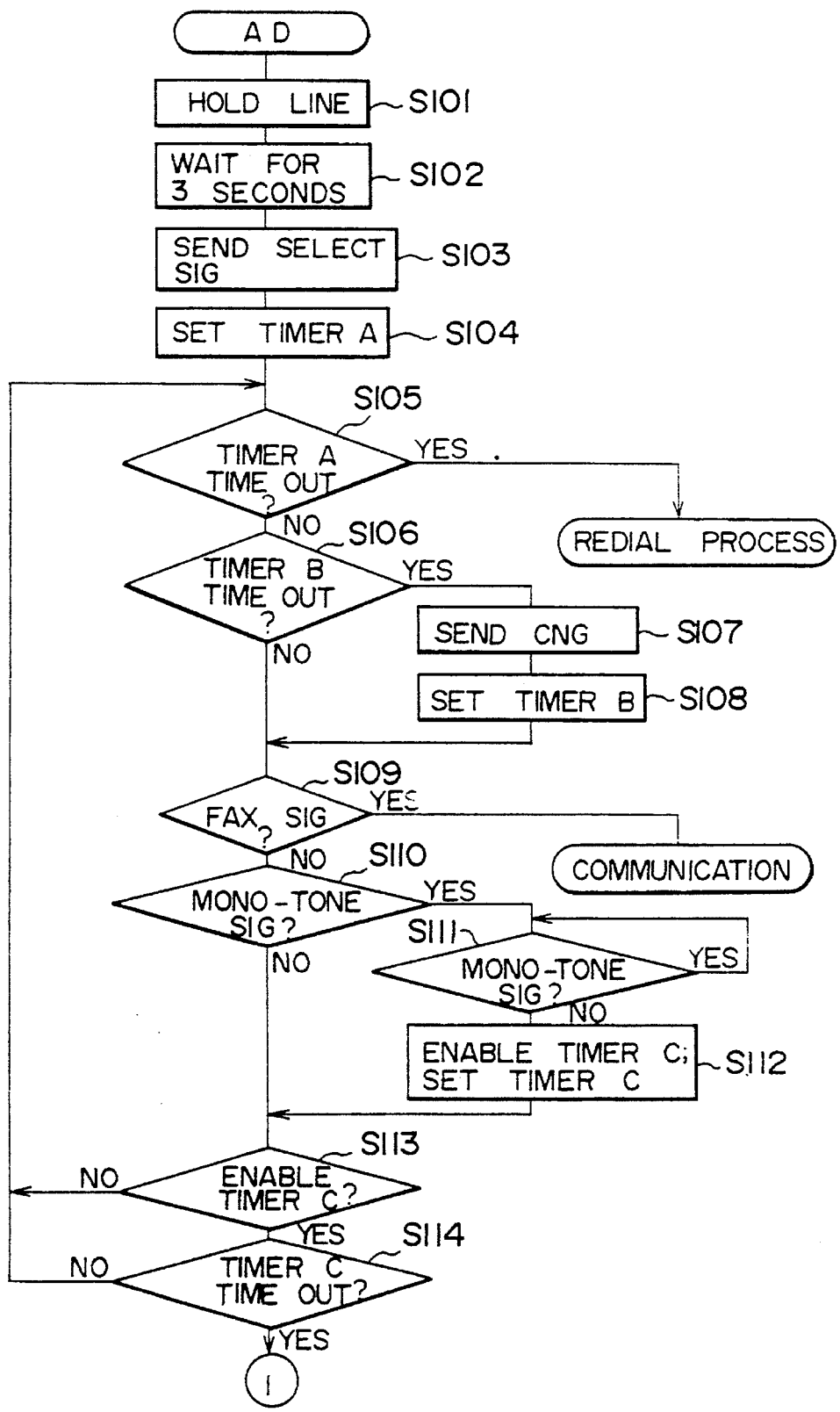
FIG. 8 is a flow chart showing an operation performed in a calling operation of the second embodiment.

FIG. 8 is a flow chart showing an operation in a calling operation of the second embodiment.

When a telephone number of a distant station is input through the console unit 106, the telephone number data is stored in the RAM 109.

Figure 11:
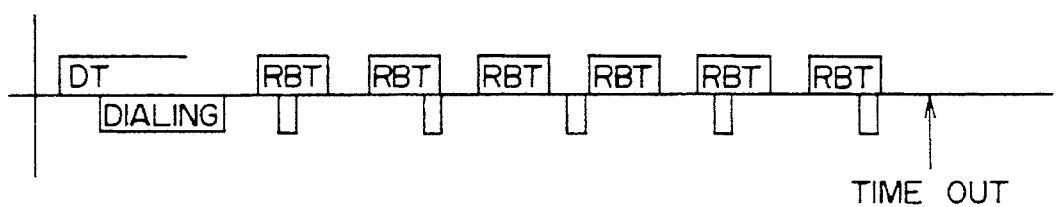
FIG. 11 is a chart showing an operation performed when a distant station does not respond, and a timer reaches a time-over state in the calling operation of the second embodiment.

The CPU 101 starts a calling operation, and causes the NCU 113 to hold a line (S101). The CPU 101 waits for a time required for receiving a dial tone signal on the line (S102). The CPU 101 then causes the select signal sender 104 to perform a dialing operation according to the previously input telephone number data (S103). The CPU 101 sets a timer A (T1=35 sec according to the CCITT recommendation T.30) used when a facsimile signal cannot be detected (step S104). Thereafter, the timer A is checked in step S105, and if it is determined that the timer A has reached a time-out state, a redial mode is set. FIG. 11 is a chart showing an operation in this case.

A timer B is then checked (step S106). The timer B is normally a 3-sec timer for controlling a CNG send timing, and is set (S108) after a CNG signal is sent (S107).

Figure 12:
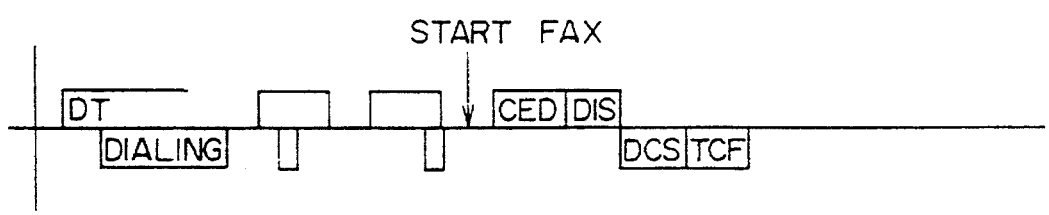
FIG. 12 is a chart showing an operation performed when a facsimile communication is started by an automatic reception function in the calling operation of the second embodiment.

Thereafter, a facsimile signal in response to the CNG signal is detected (S109). The facsimile signal is detected by the modem 102 and the tonal counter 103, and a signal to be detected includes a CED signal, a GI2 signal, a G3 standard flag sent from a V21 modem of a called party, or the like. When these signals are detected, a communication is started. FIG. 12 is a chart showing an operation in this case.

When a mono-tone signal other than these facsimile initial identification signals is detected (S110), it is identified to be a signal sent from an exchanger. The CPU 101 waits for an ON time of the received mono-tone signal (S111), and when the mono-tone signal is turned off, a timer C is enabled and set (S112). A value to be set in the timer C is preferably equal to or larger than a sum of an OFF time for one sequence of an RBT (ring-back tone), and a time from when a normal automatic receiver holds a line until it sends a CED signal. This value is properly set to be about 10 sec. Alternatively, this value may be arbitrarily set in a service mode in consideration of PBX or overseas application.

Although not shown, the timer B may be monitored in step S111, and if the timer B has reached a time-out state, a CNG signal may be sent. In recent years, a terminal or an exchanger, which can check the frequency and send timing of the CNG signal, is commercially available, and this function can be used.

If a called party is a facsimile apparatus, a flag sent from a V21 modem, a GI2 signal, or a CED signal is detected (S109) before the timer C reaches a time-out state (S113, S114), and a facsimile communication procedure is started.

Figure 9:
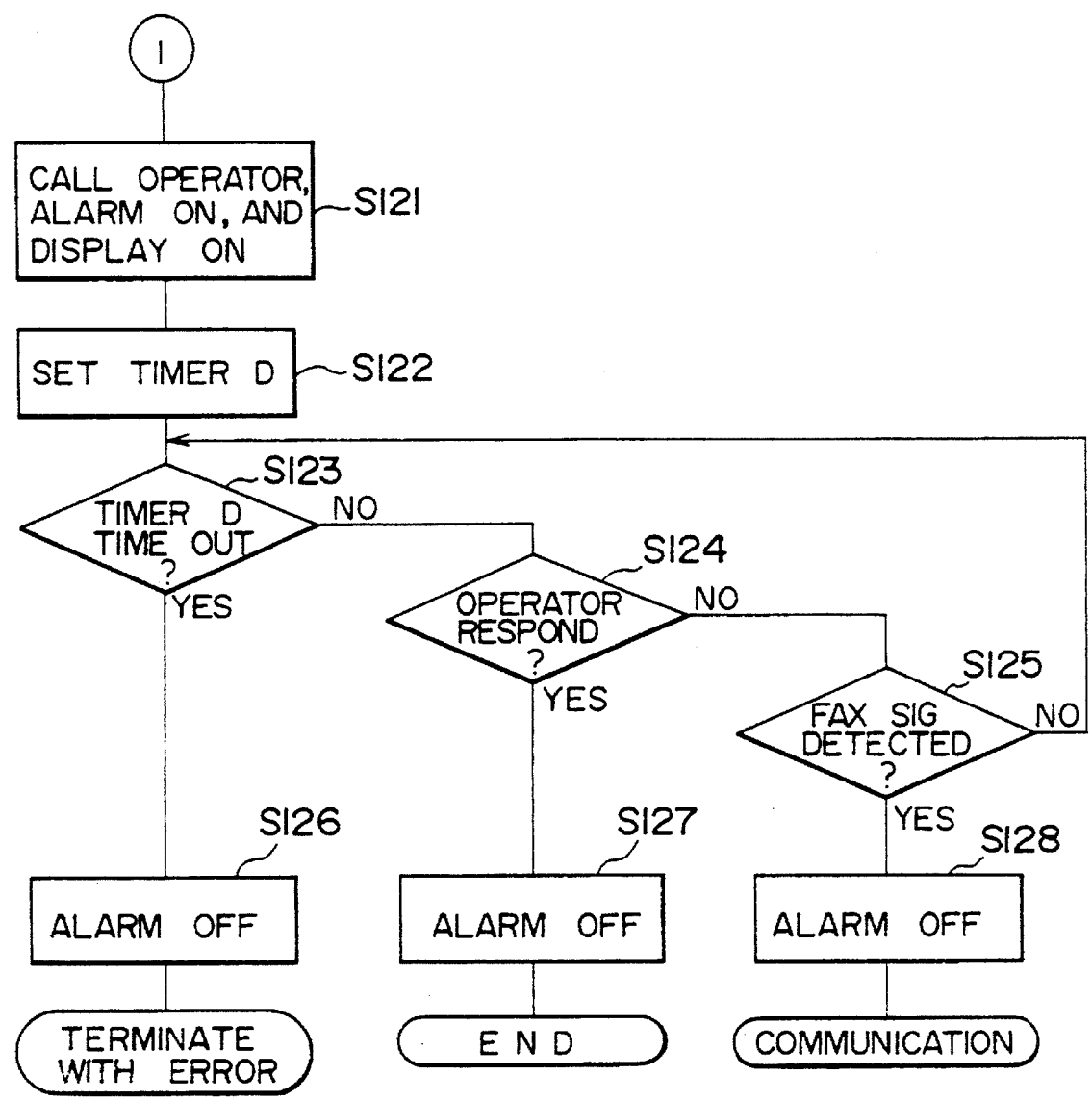
FIG. 9 is a flow chart showing an operator call operation in the calling operation of the second embodiment.

If a called party is a telephone set used by a person, since a mono-tone signal or a facsimile signal cannot be detected, the timer C reaches a time-out state, and the flow advances from step S114 to processing shown in FIG. 9.

In order to inform to an operator that a communication apparatus of the distant station is a non-facsimile terminal, an alarm and a display indicating this message are generated to call an operator (S121), and a timer D (T1=35 sec according to the CCITT recommendation T.30) is set (S122).

The CPU waits for detection of the time-out state of the timer D, a response by an operator of the calling party, or a facsimile signal sent when a called party notices facsimile termination, and enables a facsimile mode, while continuously calling the operator. Note that it is effective to simultaneously send a CNG signal since the possibility that the called party notices facsimile termination becomes high.

If it is determined that the timer D has reached a time-out state (S123), it is determined that a connection cannot be attained, and the operator call operation is ended. Thereafter, error termination processing is performed (S126). In this case, since the distant station is a non-facsimile terminal, no redial operation is performed.

Figure 13:
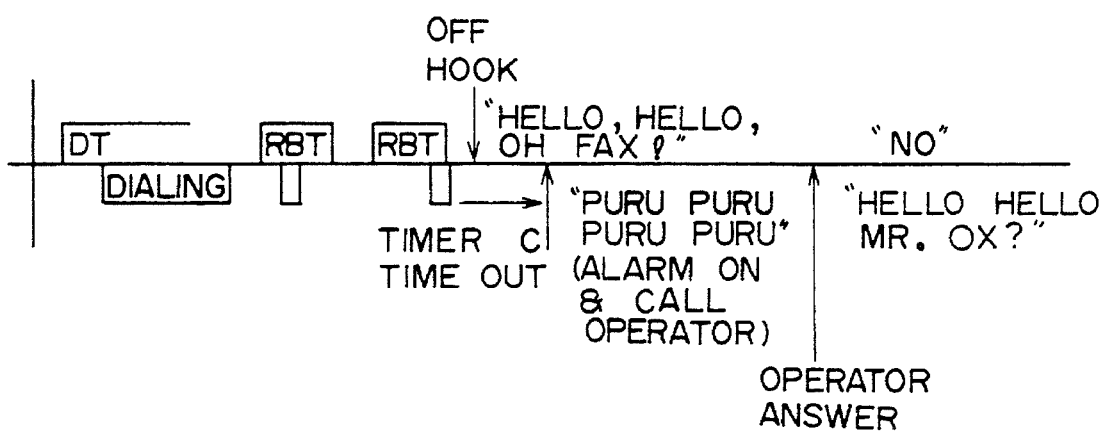
FIG. 13 is a chart showing an operation performed when operator call processing is performed in the calling operation of the second embodiment, and an operator responds.

If the operator responds (S124), the operator call operation is ended, and the line is switched to a telephone set, thus ending processing (S127). Thus, when the called party still holds the line, a conversation can be performed, and thereafter, a facsimile communication can be started by mutual consent. FIG. 13 is a chart showing an operation in this case.

Figure 14:
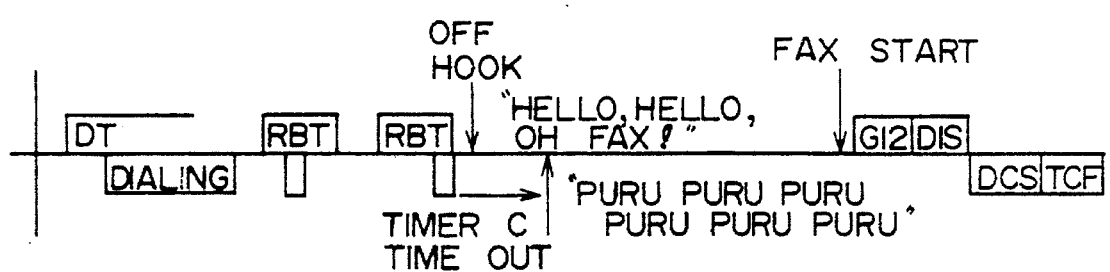
FIG. 14 is a chart showing an operation performed when a facsimile communication is started by a manual reception function in the calling operation of the second embodiment.

If the facsimile signal can be detected (S125), the operator call operation is ended, and a facsimile communication is performed (S128). FIG. 14 is a chart showing an operation in this case.

In the above embodiment, a ring-back tone is discriminated upon detection of an OFF state of a mono-tone signal in terms of easy creation of software programs. However, the following third embodiment may be employed in spite of cumbersome program creation.

Figure 10:
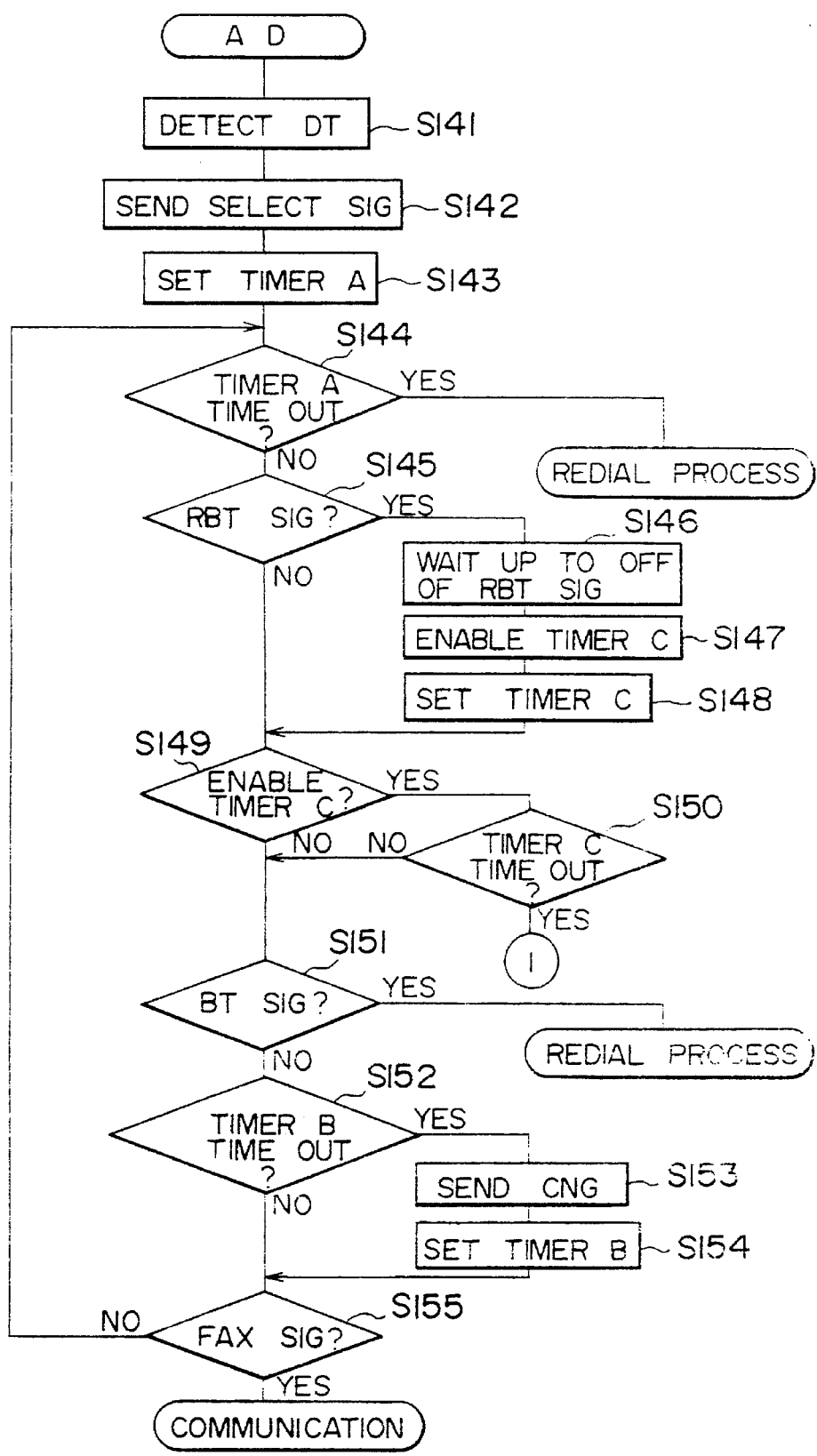
FIG. 10 is a flow chart showing an operation in a calling operation according to the third embodiment of the present invention.

FIG. 10 is a flow chart showing an operation of the third embodiment.

In this embodiment, data of an ON time, an OFF time, and a frequency of an RBT, and data of a BT (busy tone) are given in advance. The ON/OFF time and the frequency of a signal from an exchanger are detected, and are compared with the stored data, thereby discriminating the RBT and BT.

In FIG. 10, a dial tone is detected (S141), and the select signal sender 104 performs a dialing operation (S142). The timer A is set (S143). If it is determined that the timer A has reached a time-out state, a redial mode is set.

If the RBT is detected (S145), the control waits until the RBT is turned off (S146). The timer C is enabled (S147), and is set (S148). If the timer C is enabled (S149), the processing shown in FIG. 9 is started upon detection of the time-out state of the timer C (S150).

If the timer C is not enabled (S149), and the BT signal is detected (S151), the redial mode is set. Furthermore, if the BT signal is not detected, a CNG send operation and a set operation of the timer B are repeated (S152 to S154). If a facsimile signal is detected (S155), a communication is started.

With this method, since the number of parameters to be monitored is increased, it becomes cumbersome to create software programs. However, since the RBT can be discriminated, a call termination timing at a distant station can be more precisely determined.

The present invention is not limited to the above embodiment, and various changes and modifications may be made within the spirit and scope of the invention.

What is claimed is:

1. A communication apparatus for performing auto-dial process for repetitively calling a distant station using a selected call number until a connection can be attained, comprising:

dialing means for dialing in accordance with the selected call number;

detecting means for detecting a response state of the distant station or an exchanger through a line after a calling operation by said dialing means;

judging means for judging whether the selected call number is correct or false, in accordance with a detection state of said detecting means;

counting means for counting a number of times that said judging means judges that the selected call number is false; and control means for inhibiting the auto-dial process of the selected call number in accordance with a count value of said counting means.

2. An apparatus according to claim 1, wherein said control means allows said dialing means to dial the selected call number when the count value is less than a predetermined value.

3. An apparatus according to claim 1, further comprising key means for selecting a call number, and preserving means for preserving the count value corresponding to the selected call number.

4. An apparatus according to claim 1, further comprising display means for displaying an announcement that the distant station is not to be called in accordance with the count value of said counting means.

5. An apparatus according to claim 1, further comprising a key for releasing the inhibiting control by said control means so as to enable the auto-dial process of the call number.

6. An apparatus according to claim 1, wherein said detecting means includes means for detecting a busy tone signal indicating that the distant station is busy, and means for detecting a signal relating to facsimile communication, and wherein said judging means judges that the selected call number is false when neither the busy tone signal nor the signal relating to facsimile communication is detected within a predetermined time after dialing.

7. A method for performing auto-dial processing for repetitively calling a distant station using a selected call number until a connection can be obtained, comprising the steps of:

dialing in accordance with the selected call number;

detecting whether the selected call number is correct or false;

counting a number of detection times that the selected call number is false; and inhibiting the auto-dial process of the selected call number in accordance with a count value produced by said counting step.

8. An apparatus according to claim 7, wherein in said inhibiting step it is determined whether the auto-dial process is to be inhibited when the selected call number is selected through key means for selecting a call number.

9. An apparatus according claim 7, further comprising a displaying step, in said inhibiting step, of displaying that the auto-dial process is inhibited.

10. An apparatus according to claim 7, wherein said inhibiting step includes a step of resetting the inhibiting of the auto-dial process by operation of a predetermined key.

11. A method according to claim 7, wherein said detecting step includes a step of detecting a busy tone signal indicating that the distant station is busy, a step of detecting a signal relating to facsimile communication, and a step of judging whether or not either the busy tone signal or the signal relating to facsimile communication is detected within a predetermined time after dialing.

12. A method according to claim 11, wherein said detecting step detects that the selected call number is false when neither the busy tone signal nor the signal relating to facsimile communication is detected in the predetermined time.

13. An auto-dialing method comprising the steps of:

dialing according to a selected call number;

detecting a response state of a distant station corresponding to the selected call number or exchanger through a line after a calling operation;

judging whether the selected call number is correct or false in accordance with a detection result by said detecting step;

counting a number of times when the selected call number is judged false;

auto-dialing the selected call number in accordance with a detection result by said detecting step; and inhibiting the auto-dial process in accordance with a count value produced by said counting step.

14. A method according to claim 13, wherein the call number is selected by a one-touch dial key.

15. A method according to claim 13, wherein said detecting step includes a step of detecting a busy tone signal indicating that the distant station is busy, and a step of detecting a signal relating to facsimile communication.

16. A method according to claim 15, wherein said judging step judges whether either the busy tone signal or the signal relating to facsimile communication occurs within a predetermined time after dialing.

17. A method according to claim 16, wherein said judging step judges that the call number is false when neither the busy tone signal nor the signal relating to facsimile communication is detected in the predetermined time.

18. A method according to claim 15, further comprising a step of releasing the inhibiting state by said inhibiting step so as to enable the auto-dial process of the selected call number.

19. A data communication apparatus for performing an auto-dial process for repetitively calling a distant station using a selected call number, comprising:

dialing means for dialing in accordance with the selected call number;

first detecting means for detecting a busy tone signal indicating that the distant station is busy;

second detecting means for detecting a signal relating to data communication; and control means for judging whether either the busy tone signal or the signal relating to data communication is detected within a predetermined time after dialing, for inhibiting the auto-dial process of the selected call number in accordance with the judgement, and for causing said dialing means to perform a redialing process in accordance with a detection of the busy tone signal, wherein said control means judges that the selected call number is false when neither the busy tone signal nor the signal relating to data communication is detected in the predetermined time, and inhibits the auto-dial process of the selected call number when the call number is judged false.

20. An apparatus according to claim 19, wherein said control means includes counting means for counting a number of judgement times that the call number is false, and said control means inhibits the auto-dial process of the selected call number in accordance with a count value of said counting means.

21. An apparatus according to claim 19, further comprising means for manually releasing the inhibiting control by said control means.

22. A data communication method for performing an auto-dial process for repetitively calling a distant station using a selected call number, comprising the steps of:

dialing in accordance with the selected call number;

detecting a busy tone signal indicating that the distant station is busy;

detecting a signal relating to data communication; and judging whether either the busy tone signal or the signal relating to data communication is detected within a predetermined time after dialing, for inhibiting the auto-dial process of the selected call number in accordance with the judgement, and for causing said dialing step to perform a redialing process in accordance with a detection of the busy tone signal, wherein said judging step judges that the selected call number is false when neither the busy tone signal nor the signal relating to data communication is detected in the predetermined time, and inhibits the auto-dial process of the selected call number when the call number is judged false.

23. A method according to claim 22, wherein said judging step includes a counting step of counting a number of judgment times when the call number is false, and said judging step inhibits the auto-dial process of the call number in accordance with a count value in said judging step.

24. A method according to claim 22, further a step of manually releasing the inhibiting control in said judging step.

* * * * *

UNITED STATES PATENT AND TRADEMARK OFFICE
CERTIFICATE OF CORRECTION

PATENT NO. : 5,479,500
DATED : December 26, 1995
INVENTOR(S) : Susumu Matsuzaki, et al.

It is certified that error appears in the above-indentified patent and that said Letters Patent is hereby corrected as shown below:

ON TITLE PAGE

In [56] References Cited, under U.S. PATENT DOCUMENTS:
"4,741,021 11/1980 Kotani et al." should read
--4,741,021 4/1980 Kotani et al.--.

In [56] References Cited, under FOREIGN PATENT DOCUMENTS:
"0089655 4/1989 Japan" should read --89855 4/1989 Japan--.

COLUMN 10

Line 59, "further" should read --further comprising--.

Signed and Sealed this

Twenty-first Day of May, 1996

Attest:

BRUCE LEHMAN

Attesting Officer        Commissioner of Patents and Trademarks